US012734605B2

(12) United States Patent
Oswald et al.

(10) Patent No.: US 12,734,605 B2
(45) Date of Patent: Sep. 15, 2026

(54) HANDHELD LASER MACHINING APPARATUS FOR MACHINING A WORKPIECE, AND FUNNEL FOR A HANDHELD LASER MACHINING APPARATUS

(71) Applicant: Oswald Elektromotoren GmbH, Miltenberg (DE)

(72) Inventors: Johannes Oswald, Miltenberg (DE); Michael Mozin, Eichenbühl (DE)

(73) Assignee: Oswald Elektromotoren GmbH, Miltenberg (DE)

( * ) Notice: Subject to any disclaimer, the term of this patent is extended or adjusted under 35 U.S.C. 154(b) by 991 days.

(21) Appl. No.: 17/773,297

(22) PCT Filed: Oct. 5, 2020

(86) PCT No.: PCT/EP2020/077882
§ 371 (c)(1),
(2) Date: Jun. 24, 2022

(87) PCT Pub. No.: WO2021/083618
PCT Pub. Date: May 6, 2021

(65) Prior Publication Data

US 2023/0061659 A1 Mar. 2, 2023

(30) Foreign Application Priority Data

Oct. 31, 2019 (DE) .................... 10 2019 129 503.3

(51) Int. Cl.
*B23K 26/00* (2014.01)
*B23K 26/064* (2014.01)
(Continued)

(52) U.S. Cl.
CPC ...... *B23K 26/0096* (2013.01); *B23K 26/0643* (2013.01); *B23K 26/0648* (2013.01);
(Continued)

(58) Field of Classification Search
CPC ........... B23K 26/0096; B23K 26/0643; B23K 26/0648; B23K 26/082; B23K 26/128; B23K 26/703; B23K 37/006
See application file for complete search history.

(56) References Cited

U.S. PATENT DOCUMENTS 6,114,651 A * 9/2000 Schluter .................. B08B 15/04
219/121.68
6,160,835 A 12/2000 Kwon
(Continued)

FOREIGN PATENT DOCUMENTS

CN 106984596 A 7/2017
CN 206747169 U 12/2017
(Continued)

OTHER PUBLICATIONS

Machine translation of DE-10059246-A1, May 2025 (Year: 2025).*
(Continued)

*Primary Examiner* — Tiffany T Tran
(74) *Attorney, Agent, or Firm* — GREENBLUM & BERNSTEIN, P.L.C.

(57) ABSTRACT

The invention relates to a handheld laser machining apparatus for machining a workpiece. The laser machining apparatus comprises a handheld apparatus (100) comprising an optical device for deflecting laser beams onto the workpiece, a supply unit (3) for open-loop or closed-loop control of the handheld device and/or for supplying power/fluid to the handheld device, and a funnel (4) for coupling the handheld device to the workpiece. The invention also relates to a funnel (4) for a corresponding laser machining apparatus.

9 Claims, 6 Drawing Sheets

Figure 1:
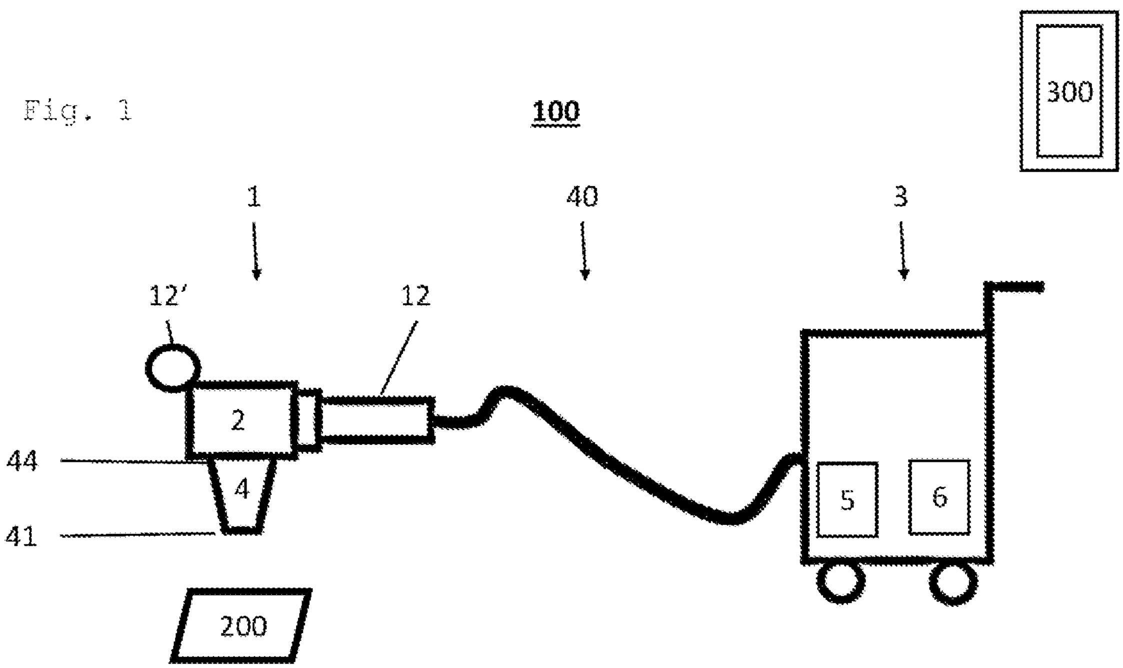

(51) Int. Cl.

| | |
|---|---|
| ***B23K 26/082*** | (2014.01) |
| ***B23K 26/12*** | (2014.01) |
| ***B23K 26/70*** | (2014.01) |
| ***B23K 37/006*** | (2025.01) |

(52) U.S. Cl.

CPC .......... *B23K 26/082* (2015.10); *B23K 26/128* (2013.01); *B23K 26/703* (2015.10); *B23K 37/006* (2013.01)

(56) References Cited

U.S. PATENT DOCUMENTS

| | | | | |
|---|---|---|---|---|
| 2014/0113243 | A1* | 4/2014 | Boutoussov | A61C 1/081 433/29 |
| 2014/0209585 | A1 | 7/2014 | Siewert et al. | |
| 2018/0200839 | A1* | 7/2018 | Timmerman | B23K 26/0876 |
| 2019/0039172 | A1* | 2/2019 | Grapov | H01S 3/06704 |
| 2019/0160592 | A1* | 5/2019 | Akahoshi | B23K 26/38 |
| 2019/0262931 | A1 | 8/2019 | Plumb et al. | |
| 2021/0205921 | A1* | 7/2021 | Nakashima | B23K 26/082 |

FOREIGN PATENT DOCUMENTS

| | | | | |
|---|---|---|---|---|
| DE | 10059246 | A1 * | 6/2002 | B23K 26/361 |
| DE | 20 2011 051-153 | U1 | 12/2011 | |
| DE | 10 2011 001 322 | A1 | 9/2012 | |
| DE | 10 2015 118 486 | A1 | 5/2017 | |
| DE | 10 2016 121 911 | A1 | 5/2018 | |
| EP | 2 564 977 | A2 | 3/2013 | |

OTHER PUBLICATIONS

Office action of counterpart German Patent Application No. 10 2019 129 503.3, the Office action dated Aug. 8, 2022, along with an English language translation thereof.

International Search Report issued in International Patent Application No. PCT/EP2020/077882, dated May 7, 2021, along with an English translation thereof.

Written Opinion of the International Searching Authority issued in International Patent Application No. PCT/EP2020/077882, dated May 7, 2021.

* cited by examiner

HANDHELD LASER MACHINING APPARATUS FOR MACHINING A WORKPIECE, AND FUNNEL FOR A HANDHELD LASER MACHINING APPARATUS

The invention relates to a handheld laser machining apparatus for machining a workpiece. The laser machining apparatus comprises a handheld apparatus with an optical device for deflecting laser beams onto the workpiece, a supply unit for controlling the handheld apparatus in an open-loop or closed-loop manner and/or for supplying power and fluid to the handheld apparatus, and a funnel for coupling the handheld apparatus to the workpiece. The invention is also directed to a funnel for a corresponding laser machining apparatus.

Laser machining apparatuses of the generic type serve the purpose of inscribing or otherwise marking objects such as workpieces of metal or else of other materials by means of a laser beam. The known laser machining apparatuses have a series of disadvantages and problems, which are overcome according to the invention. For instance, the handling of the laser machining apparatuses is made more difficult by their size or weight. When using the handheld apparatus of the laser machining apparatus, it must be held by hand against an object to be machined as long as the machining of the object is not completed.

For the correct machining of the object, it is important that the handheld apparatus is not moved in relation to the object during the machining. Should the handheld apparatus nevertheless be moved in relation to the object during the machining, for example because the handheld apparatus is too unwieldy or too heavy, this can result in defective inscription or machining of the object. If the handheld apparatus is moved away from the object to be machined and a gap is thus produced between the handheld apparatus and the object, this can also lead to an interruption in the machining or to an endangerment of persons in the area of influence of the laser.

Against this background, the object of the invention is to provide an improved handheld laser machining apparatus which overcomes the aforementioned problems. In particular, the laser machining apparatus according to the invention is intended to improve the handling or the ergonomics of the apparatus, and consequently the quality and the reliability of the machining.

This object is achieved according to the invention by a laser machining apparatus with the features of claims 1 and 8 and also by a funnel for corresponding laser machining apparatuses according to claim 20. Advantageous refinements are the subject of the subclaims.

According to a first aspect of the invention, a handheld laser machining apparatus for machining a workpiece is provided. The laser machining apparatus comprises

- a handheld apparatus with an optical device for deflecting laser beams onto the workpiece,
- a supply unit for controlling the handheld apparatus in an open-loop or closed-loop manner and/or for supplying power and fluid to the handheld apparatus, and
- a funnel with a handheld apparatus side and a workpiece side for coupling the handheld apparatus to the workpiece.

According to the invention, two different pumps are provided, by means of which two different negative pressure regions which are separate from one another can be generated at the funnel. The different negative pressure regions may be generated in particular whenever the handheld apparatus is pressed against a workpiece by way of the funnel and a space or spaces in which the negative pressure regions at different negative pressures can be held are bounded by the workpiece and the funnel.

The different negative pressure regions may differ in that one of the regions has a much lower pressure than the other negative pressure region. This lower pressure may be chosen such that the handheld apparatus is coupled better to the workpiece in comparison with the prior art. Since a more stable connection between the workpiece and the handheld apparatus is consequently created, the workpiece can no longer be so easily displaced with respect to the handheld apparatus. For a user, it is consequently made easier in the handling to hold the handheld apparatus correctly.

In a preferred embodiment of the invention, it is provided that the funnel comprises on the workpiece side two negative pressure regions that are sealed with respect to one another and mounted one inside the other and/or that the funnel comprises a receiving portion for an exhaust-air filter element and/or a receiving portion for an optical element and/or that the funnel comprises two seals respectively on the workpiece side and on the handheld apparatus side, wherein in particular an outer seal on the workpiece side of the funnel is an angular seal and particularly preferably a sealing frame.

The negative pressure regions may for example be formed as grooves or other depressions on the workpiece side of the funnel, in which also different negative pressures can be generated and maintained. It is consequently possible to generate a lower negative pressure, selected for allowing coupling of the handheld apparatus to the workpiece that is as stable as possible, in one negative pressure region. The negative pressure region with the lower pressure may have a smaller volume than the negative pressure region with the higher pressure, in order that its evacuation is made easier.

Alternatively or additionally, the funnel may comprise a receiving portion for an exhaust-air filter element, which filters, or at least prefilters, exhaust air extracted by means of the funnel.

If such a filter element is provided on the funnel, it is particularly easy to clean or change the filter element if need be. An alternative or additional exhaust-air filter element may be arranged upstream of at least one of the pumps, in particular a suction pump. The mentioned exhaust-air filter elements may be prefilters, which are arranged upstream of the main filter to protect it. The exhaust-air filter element may alternatively or additionally be arranged, or fastened or integrated, on other components of the laser machining apparatus. The other components may be for example a scanner mounting, a mirror deflecting and adjusting system and/or a collimator mounting of the laser machining apparatus.

Furthermore, a receiving portion for an optical element may be provided on the funnel, wherein the optical element may be for example a viewing window or a camera. If a viewing window is used, this represents an easy and reliable possibility for visually monitoring the machining process. By means of a camera, more complex monitoring can be correspondingly ensured, allowing both remote monitoring and recording or storage of the images captured by means of the camera. In particular, it is thus also possible to create a live image of the region to be machined and to further process this, optionally digitally.

In an embodiment of the invention in which the funnel comprises two seals respectively on the workpiece side and on the handheld apparatus side, these allow different pressure regions on the workpiece side to be maintained more easily. An outer seal on the workpiece side of the funnel may in this case be an angular seal and particularly preferably a sealing frame. The form of the workpiece side of the funnel can be easily adapted to the form in which the laser beams act on the workpiece. Since the laser beams are often output in a rectangular region, the form of the funnel may be adapted to the laser beams. It is alternatively or additionally conceivable that the form of the workpiece side of the funnel can be adapted to the form of the workpiece. The form of the funnel on the scanner side or on the handheld apparatus side is preferably round, since the form of the laser-beam-focusing optical device is often likewise round. The form of the funnel on the workpiece side is preferably of an angular configuration, since the operating area of the scanner is often likewise angular. This avoids on the one hand the laser beams damaging the funnel or on the other hand an unnecessarily large funnel being required. When the forms of the funnel are described in the present case, this may mean cross sections or cross-sectional shapes at the mentioned locations of the funnel.

In a particularly preferred embodiment of the invention, it is provided that the inner of the negative pressure regions can be fluidically coupled to a suction pump and the outer of the negative pressure regions can be fluidically coupled to a vacuum pump and/or that the inner negative pressure region is coupled to the atmosphere by way of a supply-air opening. The suction pump may in this case be set up to extract exhaust air occurring during the laser machining. For this purpose, an air stream from the machined location of the workpiece in the direction of the suction pump is required. This air stream is made possible by the air flowing through the supply-air opening. By contrast, the outer negative pressure region is coupled to a vacuum pump, which provides a lower pressure or a greater negative pressure than the suction pump.

In a particularly preferred embodiment of the invention, it is provided that the supply-air opening is set up not to allow laser beams to escape to outside the funnel from the inner negative pressure region. The supply-air opening is therefore not configured as a simple, straight lead-through the wall of the funnel, but it corresponds for example to a meandering or labyrinthine lead-through. The lead-through may be formed as kinked, bent or otherwise such that no laser beams can escape to the outside through it from the interior of the funnel. The supply-air opening may be additively manufactured together with the funnel.

In a further preferred embodiment of the invention, it is provided that the funnel can be coupled to the handheld apparatus by means of a bayonet fastener, in particular secured by way of resilient pressure pieces. Such a bayonet fastener advantageously makes it possible to replace the funnel quickly and easily, for example for a differently shaped funnel, which may be set up for a machining differently shaped workpieces.

In a particularly preferred embodiment of the invention, it is provided that the bayonet fastener comprises threaded portions, which in particular include an obtuse angle with corresponding axial portions of the bayonet fastener. The threaded portions and the axial portions of the bayonet fastener may be provided on the funnel or on the handheld apparatus. The obtuse angle between the axial portions and the threaded portions of the bayonet fastener ensures that the distance between the funnel and the handheld apparatus can be set more accurately than is possible in the case of bayonet fasteners with corresponding acute angles.

It is alternatively or additionally conceivable that the threaded portions or the axial portions are unevenly distributed, or that they are arranged in non-uniform pitch circles. This provides an easy possibility for definitively defining the relative position of the funnel in relation to the handheld apparatus, so that the two components can only be coupled at a predefined angle or a predefined position in relation to one another.

In a preferred embodiment of the invention, it may be provided that at least one of the pumps is provided in the supply unit and/or that a safety device is provided, which is set up to interrupt the laser beams if the differential pressure between one of the negative pressure regions and the ambient pressure lies outside a permissible range.

The supply device can accommodate all of the components of the laser machining apparatus that are too large or too heavy for the handheld apparatus. If correspondingly large pumps are used for performing the invention, they may be provided in the supply device to allow better ease of handling of the handheld apparatus.

The safety device may comprise at least one pressure sensor, which registers a breakdown of the negative pressure in the region of the funnel. The pressure sensor or the pressure sensors may be provided in the region and/or outside the region of the handheld apparatus.

According to a second aspect of the invention, a handheld laser machining apparatus for machining a workpiece is provided. The laser machining apparatus comprises

- a handheld apparatus with an optical device for deflecting laser beams onto the workpiece,
- a supply unit for controlling the handheld apparatus in an open-loop or closed-loop manner and/or for supplying power and fluid to the handheld apparatus, and
- a funnel with a handheld apparatus side and a workpiece side for coupling the handheld apparatus to the workpiece.

According to the second aspect of the invention, it is provided that the handheld apparatus comprises a scanner, mounted on a scanner mounting, a mirror deflecting and adjusting system and a collimator, mounted in a collimator mounting. The mirror deflecting and adjusting system offers an easy possibility for adjusting the laser beam provided by the collimator by means of the adjustable mirrors provided therein. The use of the mentioned components allows the handheld apparatus to be advantageously made particularly small and lightweight, and consequently handy. Given adequate compactness, a complete laser beam source may be integrated in the handheld apparatus or in its handle instead of the collimator. The term collimator should therefore be understood in the present case in a broad sense.

In a preferred embodiment of the invention, it is conceivable that the scanner mounting couples the mirror deflecting and adjusting system to the scanner and the funnel directly. As a result, a particularly compact type of construction of the handheld apparatus can be realized. It is also conceivable that the scanner mounting is produced in one piece, and consequently particularly easily. It is alternatively or additionally conceivable that the scanner mounting comprises at least one sealing portion for the fluid-tight connection of the mirror deflecting and adjusting system. It can in this way be ensured that as far as possible no contaminants penetrate into the path of the laser running within the laser machining apparatus and thus impair the functionality of the apparatus. It may also be provided that the scanner mounting comprises at least one lead-through for pins for positioning the mirror deflecting and adjusting system and/or the scanner. Correspondingly positioned pins allow exact and permanent positioning of the components to be ensured, as is required for correct operation of the laser machining apparatus. It may also be provided that the scanner mounting comprises clearances for disconnecting screws for separating the scanner mounting from the mirror deflecting and adjusting system. By means of the disconnecting screws mentioned in the present description, components that are coupled to one another can for example be separated from one another for maintenance purposes without being damaged. In this case, the clearances for the disconnecting screws ensure that the disconnecting screw does not cause any disruptive deformation, which would prevent the components that are at first separated from one another from being coupled together again with an exact fit. It may furthermore be provided that the scanner mounting is produced in one piece, in particular is printed and/or sintered. When reference is made in the present case to printed and/or sintered components, this may include machining steps such as selective laser melting, selective laser sintering, buildup welding or CMT welding methods and/or fused deposit modeling or melt layering.

In a preferred embodiment of the invention, it is conceivable that the scanner mounting comprises a through-hole for guiding the laser beam from the mirror deflecting and adjusting system to the workpiece, wherein the through-hole is in particular a threaded bore. By way of the thread, the scanner mounting may be coupled to a stop plate and/or a measuring tube. The stop plate may in this case ensure protection of components of the device, while the measuring tube can easily be coupled to the scanner mounting by way of the thread for adjusting the mirrors or the laser beam. It may also be provided that the scanner mounting comprises a sealing surface for placing against the funnel, whereby contiguous negative pressure regions in the funnel and in the region of the scanner mounting can be easily maintained. It may alternatively or additionally be provided that the scanner mounting comprises a thermal attachment surface for dissipating heat from the scanner, wherein the lost heat of the scanner is produced near the attachment surface. This may be the case whenever electrical loads of the scanner are arranged near the attachment surface.

In a preferred embodiment of the invention, it is conceivable that the scanner mounting comprises a coupling portion for coupling the scanner mounting to a protective glass of the scanner. The coupling portion may in this case be formed for example as a threaded portion, into which the protective glass of the scanner can be screwed. It may also be provided that the scanner mounting comprises connections, receptacles and/or lines for a camera, for an illumination, for pressure sensors, for a filter and/or prefilter, for a sensor for detecting darkness in the funnel, for an identification device for identifying the funnel, for a temperature sensor, to a suction pump and/or to a vacuum pump. The temperature sensor may in this case be arranged for example in a countersunk hole in the region of the through-hole. It can be ensured by means of the sensor that the laser machining apparatus is not used on a transparent surface such as for example a glass plate and that a risk of injury by the laser to persons behind the glass plate is thereby caused.

In a preferred embodiment of the invention, it is conceivable that the scanner mounting comprises components of a bayonet fastener by means of which the handheld apparatus can be coupled to the funnel. The scanner mounting may consequently be regarded as a central component to which a series of further components can be coupled. It is alternatively or additionally conceivable that the scanner mounting comprises clearances for pressure pieces and/or guide pins of the bayonet fastener and/or that the scanner mounting comprises threaded portions of the bayonet fastener. The invention may accordingly be configured with different oriented bayonet fastener components. The bayonet fastener may in this case be configured in detail as explained in connection with the first aspect of the invention.

In a further preferred embodiment of the invention, it is conceivable that the mirror deflecting and adjusting system comprises a mounting and/or an adjusting device for holding and/or adjusting two mirrors, wherein in particular at least one of the mirrors may be a fully reflective mirror or a partially reflective mirror. The adjusting device may in this case comprise in particular tiltable mirror holders, adjusting screws and/or elastic bearing portions, wherein the mirrors can be borne and/or can be adjusted by the mirror holders, the adjusting screws and/or the elastic bearing portions. In this way, the mirror deflecting and adjusting system offers an easy possibility for setting or adjusting the laser beam in a desired way from the collimator. It is conceivable that the mirror deflecting and adjusting system is produced in one piece, in particular is printed and/or sintered. Specific production methods that come into consideration here are mentioned further above with reference to the scanner holder and can likewise be used for producing the mirror deflecting and adjusting system.

In a further preferred embodiment of the invention, it is conceivable that the mirror deflecting and adjusting system comprises sealing portions on two opposite sides, by means of which the mirror deflecting and adjusting system can be coupled in a sealing manner to the collimator mounting and the scanner mounting. It can in this way be ensured that as far as possible no contaminants penetrate into the path of the laser running within the laser machining apparatus and thus impair the functionality of the apparatus. It is also conceivable that the mirror deflecting and adjusting system comprises lead-throughs for pins for positioning the collimator mounting and the scanner mounting. By means of the pins, the mentioned components can be coupled to one another easily and at the same time with great accuracy. It is alternatively or additionally conceivable that the mirror deflecting and adjusting system comprises an adjustable receptacle for coupling in a guide laser and/or pilot laser onto the beam path of the working laser of the laser machining apparatus. By means of the pilot laser or the guide laser, a preview of a marking to be created by the laser machining apparatus can be generated, enabling a user of the apparatus to check in advance the likely result of the work. The working laser should be understood in the present case as meaning the laser beams generated by the laser machining apparatus for machining the workpiece. It is also conceivable that the mirror deflecting and adjusting system comprises clearances for disconnecting screws for separating the mirror deflecting and adjusting system from the scanner mounting and/or from the collimator mounting.

In a further preferred embodiment of the invention, it is conceivable that the collimator mounting is coupled directly to the mirror deflecting and adjusting system and/or the mirror deflecting and adjusting system is coupled directly to the scanner mounting. The direct coupling of the mentioned components allows a particularly compact and lightweight type of construction of the handheld apparatus. It is also conceivable that the collimator mounting comprises at least one sealing portion and/or at least one coupling portion for the sealing coupling of the collimator mounting to the collimator and/or to the mirror deflecting and adjusting system. It can in this way be ensured that as far as possible no contaminants penetrate into the path of the laser running within the laser machining apparatus and thus impair the functionality of the apparatus. It is also conceivable that the collimator mounting is formed as a heat bridge for dissipating waste heat of the scanner. For this purpose, the collimator mounting is coupled to the mirror deflecting and adjusting system by way of correspondingly flat-formed connecting portions, by way of which the thermal energy can be dissipated from the scanner. It may alternatively or additionally be provided that the collimator mounting comprises lead-throughs for pins for positioning the collimator mounting on the mirror deflecting and adjusting system, wherein particularly easy and exact positioning of the mentioned components on one another is possible by means of the pins. It is also conceivable that the collimator mounting and/or the scanner mounting and/or the mirror deflecting and adjusting system are coupled to one another by way of in particular four screws. The screws may in this case be led at least partially through all of the components connected by them and a thread for fixing the screws may be provided on the collimator mounting or the scanner mounting. It may alternatively or additionally be provided that the collimator mounting comprises clearances for disconnecting screws for separating the collimator mounting from the mirror deflecting and adjusting system, so that if need be the mentioned components can be separated from one another easily and without damage. It may also be provided that the collimator mounting comprises a clamping portion for clamping the collimator against twisting, whereby the laser beams emanating from the collimator are protected from unwanted distortion. The collimator mounting may also comprise a cable and/or hose guide, through which corresponding lines can be laid between the handheld apparatus and the supply unit. The collimator mounting may also be produced in one piece, in particular is printed and/or sintered.

The features of the two aspects described above of the invention may of course coexist in combination. Furthermore, the invention may be realized according to the following exemplary embodiments.

In a preferred embodiment of the invention, it may thus be provided that the funnel is identifiable by means of an identification device on the handheld apparatus. For example, an RFID transponder which can be read by way of the identification device of the handheld apparatus may be provided on the funnel. The transponder may contain data concerning the funnel, which can be used for setting the laser machining apparatus.

In a further preferred embodiment of the invention, it is provided that the laser machining apparatus can at least for a time be operated exclusively by way of an energy store coupled to the supply unit.

Conceivable for example as an energy store is a rechargeable battery or a battery which provides the power required for operating the laser machining apparatus and as a result facilitates its mobile use. It goes without saying that a grid connection by means of which power for operating the laser machining apparatus can be provided and/or by means of which the energy store can be charged may alternatively or additionally be provided.

In a further preferred embodiment of the invention, it is provided that the funnel and/or the handheld apparatus can be coupled to a stationary laser machining device and/or that the handheld apparatus comprises two handles which are separate from one another. It may for example be possible for the handheld apparatus to be coupled to a stationary laser machining device by way of parts of the bayonet fastener. In this way, combined mobile and stationary working with the laser machining apparatus is made possible, and consequently its flexible use.

The configuration of the handheld apparatus with a second handle further improves its ease of handling. In particular, in constrained positions such as overhead work, a user of the laser machining apparatus can hold it better.

In a further preferred embodiment of the invention, it is provided that a mobile terminal, such as a tablet or a smartphone, is provided for setting the laser machining apparatus, wherein the terminal is in particular set up to set the laser machining apparatus in a switched-off state of the supply unit. The setting of the laser machining apparatus may be understood as meaning the parameterizing, the programming or other, in particular software-related settings of the laser machining apparatus. It may be possible for the terminal to be coupled to the laser machining apparatus by radio or cable. It is conceivable that programming or setting of the laser machining apparatus can be stored on the terminal and the setting of the laser machining apparatus is transmitted if need be or whenever the laser machining apparatus is switched on.

The setting of the laser machining apparatus comprises the programming of the apparatus for carrying out laser machining steps or for creating the representations to be generated by the laser. The setting of the laser machining apparatus also comprises the changing or setting of the process parameters of the laser machining.

The invention is also directed to a funnel for a handheld laser machining apparatus according to one of the independent claims. The funnel may in this case have features that have been mentioned further above in connection with the funnel and the laser machining apparatus.

In the present case, two aspects of the invention have been described. It goes without saying that an embodiment which combines features of the two aspects is also comprised by the invention.

Figure 2A:
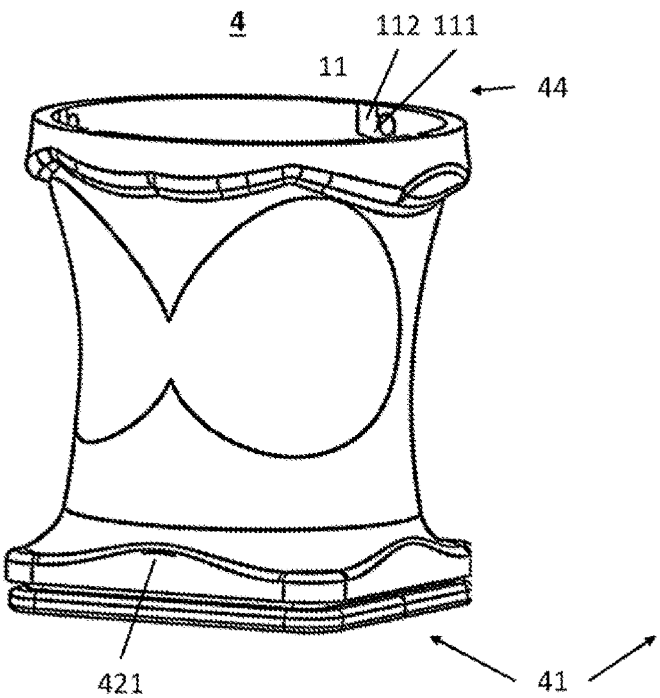
Figure 2B:
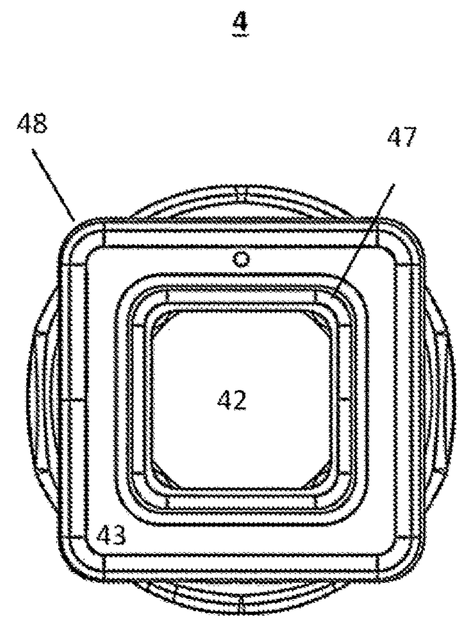
Figure 3:
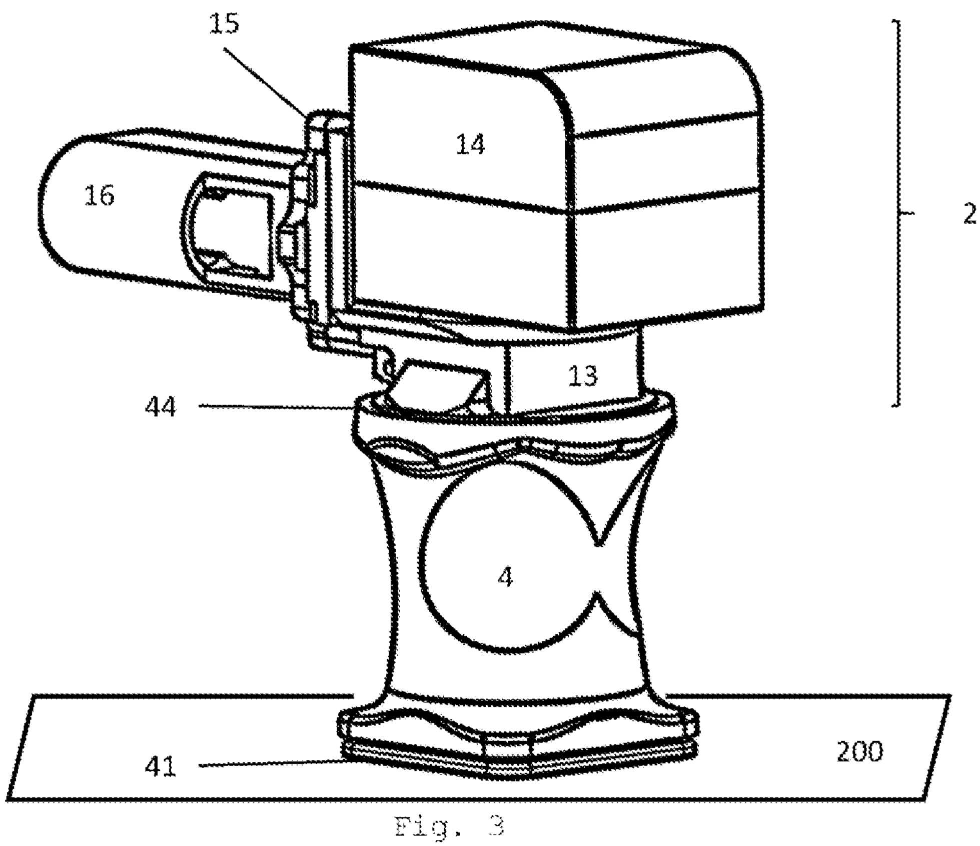
Figure 4:
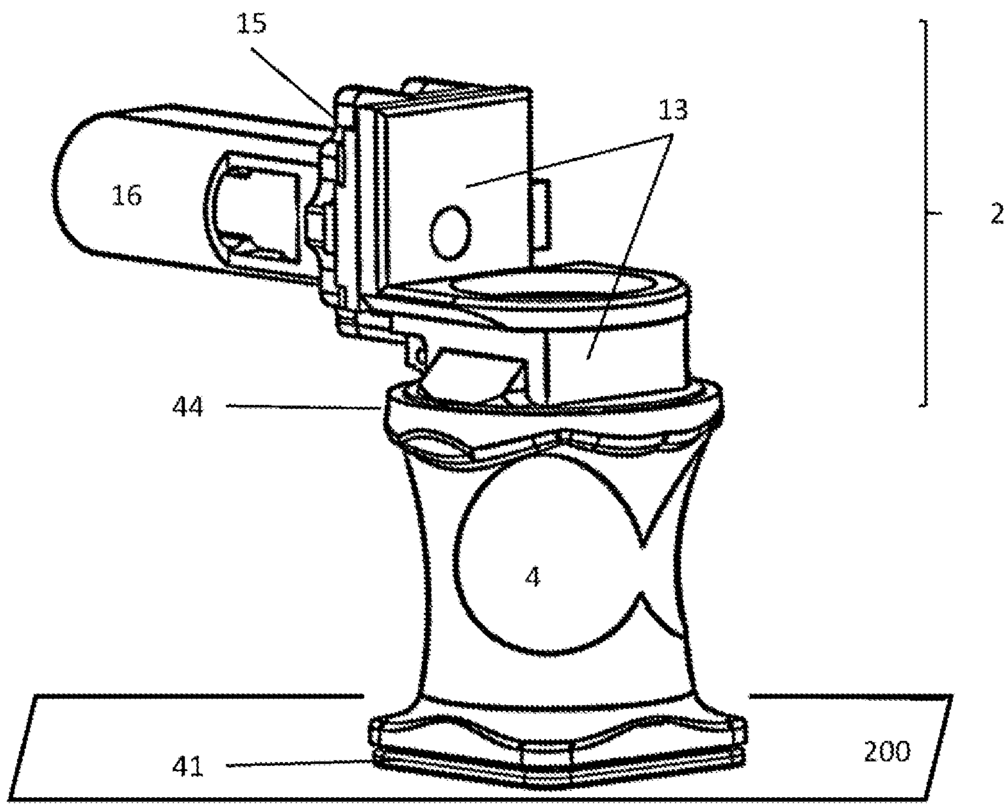
Figure 5:
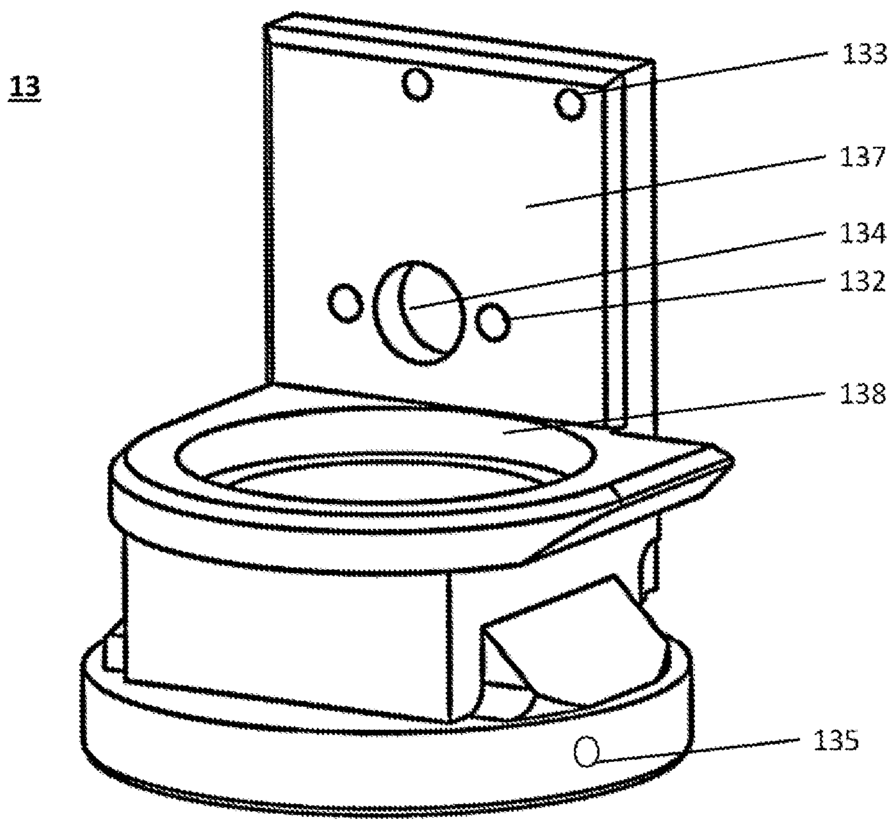
Figure 6:
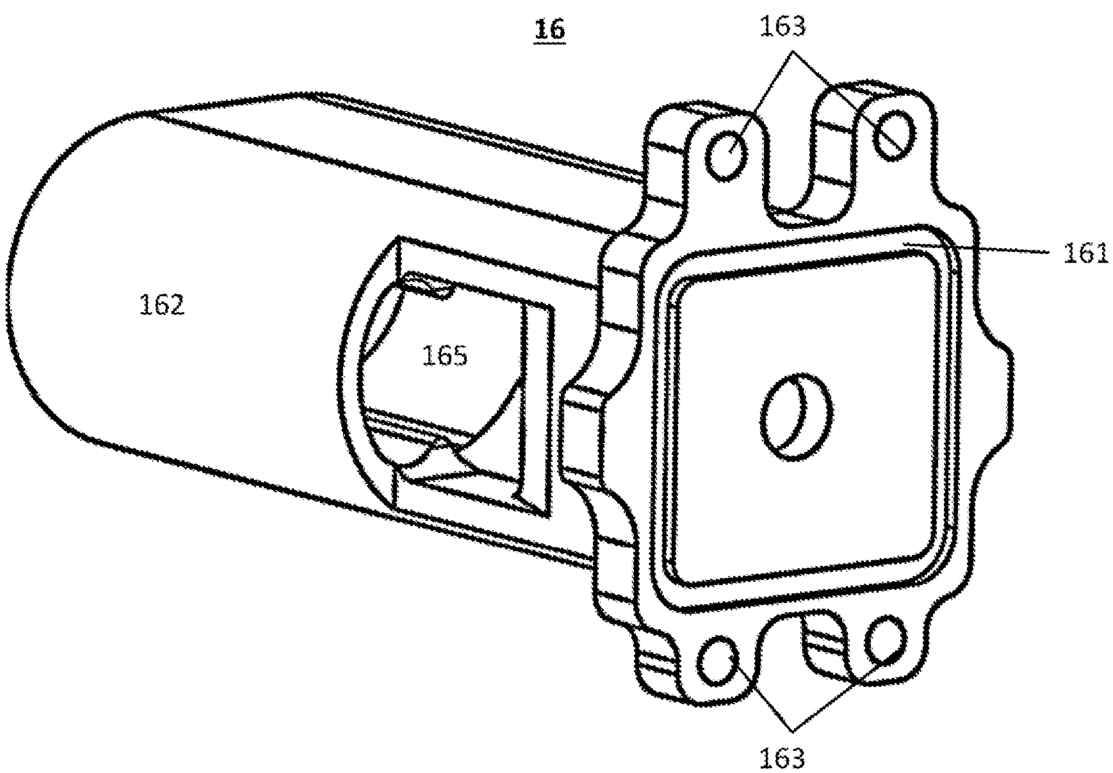

Further details and advantages of the invention are explained on the basis of the figures, in which:

FIG. 1: shows a schematic representation of the laser machining apparatus;

FIG. 2*a*: shows a side view of a funnel;

FIG. 2*b*: shows a view from below of the funnel;

FIG. 3: shows a perspective view of an optical device of the laser machining apparatus with a scanner;

FIG. 4: shows a perspective view of an optical device of the laser machining apparatus without a scanner;

FIG. 5: shows a perspective view of a scanner mounting of the laser machining apparatus; and FIG. 6: shows a perspective view of a collimator mounting of the laser machining apparatus.

FIG. 1 shows a handheld laser machining apparatus 100 for machining a workpiece 200, comprising a handheld apparatus 1 with an optical device 2, which is located inside a housing of the handheld apparatus 1 and is explained in more detail in FIGS. 3 to 6. The device 2 serves for deflecting laser beams onto the workpiece 200.

The laser machining apparatus 100 comprises a supply unit 3 for controlling the handheld apparatus 1 in an open-loop or closed-loop manner and/or for supplying power and/or fluid to the handheld apparatus 1. The fluid supply of the handheld apparatus 1 comprises in the present case in particular the extraction of exhaust gases in the region of the handheld apparatus 1 and the generation of negative pressures in the region of the handheld apparatus 1. The supply unit 3 may be of a movable design and be coupled to the handheld apparatus 1 by way of a flexible connection 40. The supply unit 3 may comprise all of the devices of the laser machining apparatus 100 that are too large and/or too heavy to be accommodated in the handheld apparatus 1. In particular, the supply unit 3 may comprise an open-loop/closed-loop control device, which can control components of the laser machining apparatus 100 in an open-loop or closed-loop manner. The supply unit 3 may comprise an energy store, with which the components of the laser machining apparatus 100 can be supplied with power. Furthermore, the supply unit 3 may comprise a laser light source, which is set up to generate laser beams for the handheld apparatus 1. The supply unit 3 may additionally comprise further components. Also conceivable is a configuration in which a laser source is completely integrated in the handheld apparatus 1 or in the handle of the handheld apparatus 1.

The laser machining apparatus 100 comprises furthermore a funnel 4 with a handheld apparatus side 44 on which the funnel 4 can be coupled to the handheld apparatus 1 and with a workpiece side 41 for coupling the handheld apparatus 1 onto the workpiece 200. During the coupling of the funnel 4 to the workpiece 200, the funnel 4 together with the handheld apparatus 1 can be pressed by a user of the laser machining apparatus 100 onto the workpiece 200 and be sucked against the workpiece 200 by way of a negative pressure or by way of two, optionally different negative pressures of two different negative pressure regions 42, 43. By way of the negative pressure, exhaust gases occurring during the machining of the workpiece 200 can be extracted and optionally introduced into the supply unit 3. Furthermore, the negative pressure can be monitored, and thus it can be established whether the funnel 4 is lying against a workpiece 200 and/or whether there is damage to the funnel 4 or to other portions of the laser machining apparatus 100 that are subjected to the negative pressure.

The laser machining apparatus 100 comprises two different pumps 5, 6, by means of which two different negative pressure regions 42, 43 which are separate from one another, are shown in more detail in FIG. 2*b*, described further below, and by means of which the handheld apparatus 1 can be sucked against the workpiece 200 can be generated at the funnel 4. Depending on the size and weight of the selected pumps 5, 6, they may be provided as shown in the supply unit 3, or at least one of the pumps may be arranged in the handheld apparatus 1.

FIG. 1 does not show a grid connection of the laser machining apparatus 100, but such a connection may of course be provided in order to supply the laser machining apparatus 100, and optionally an energy store provided therein, with power. The laser machining apparatus 100 or its components may be designed for such power-saving operation that the laser machining apparatus 100 can at least for a time be operated exclusively by way of an energy store coupled to the supply unit 3.

It can be seen in the representation of FIG. 1 that the laser machining apparatus 100 is designed for mobile operation that is at least for a time independent of a power supply grid. It may however also be provided that the funnel 4 and/or the handheld apparatus 1 can be coupled to a stationary laser machining device. The stationary laser machining device may be for example part of a production line in which workpieces are inscribed or marked by a laser. The stationary laser machining device may in this case replace the function of the funnel 4. One aspect of this function of the funnel is that of providing protection for persons nearby from injury by the laser light, allowing the extraction of the exhaust gases occurring during the laser machining and fixing a defined distance of the handheld apparatus 1 from the workpiece 200.

In particular, it may be possible that the handheld apparatus 1 can be coupled to the stationary laser machining device by way of the same coupling portion by way of which the handheld apparatus 1 can be coupled to the funnel. In this case, it is merely necessary for the funnel 4 to be removed and the handheld apparatus to be coupled instead to the stationary laser machining device. As a result, combined use of the laser machining apparatus 100 is possible.

For better handling of the handheld apparatus 1 two handles 12, 12' which are separate from one another and which a user of the laser machining apparatus respectively holds with one hand at the same time are provided on it. The handles 12, 12' may be provided at opposite end regions of the handheld apparatus 1 and in particular have gripping regions arranged transversely in relation to one another. A first handle 12 may be arranged in a region of the handheld apparatus in which the flexible connection 40 is led into the handheld apparatus 1. This first handle 12 may be arranged substantially parallel to the region of the flexible connection 40 that is closest to the handle 12. In particular, it is conceivable that the flexible connection is led through the first handle. The second handle 12' may be arranged perpendicularly or at an angle greater than for example 45° or adjustably in relation to the first handle 12. The two handles 12, 12' and the funnel 4 may be arranged on outermost regions of the handheld apparatus 1 in the side view thereof of FIG. 1.

For setting, programming or controlling the laser machining apparatus 100, a mobile terminal 300 may be provided, wherein the terminal 300 is set up in particular for setting the laser machining apparatus 100 in a switched-off state of the supply unit 3. Thus, irrespective of its state and position, data concerning machining programs or concerning settings of the laser machining apparatus 100 can be input into the terminal 300. The laser machining apparatus 100 can then also be coupled to the terminal 300 by way of cables or else without cables at a different time from the data transmission. The terminal 300 may be a tablet, a smartphone or some other data input and output device.

The funnel 4 itself may be additively manufactured, and optionally created individually to correspond to individual user profiles. The shape and size of the funnel 4 may in this case depend inter alia on the workpieces 200 to be machined and/or on the space available for machining the workpieces 200. Different funnels 4 may in this case be shaped such that they can be coupled to the handheld apparatus 1 by way of identically configured coupling portions.

FIGS. 2*a* and 2*b* show the funnel 4 in different views. It may be possible that the funnel 4 can be coupled to the handheld apparatus 1 by means of a bayonet fastener 11 secured in particular by way of resilient pressure pieces. FIG. 2*a* shows parts of the bayonet fastener 11, to be specific threaded portions 111 and axial portions 112, into which corresponding pins of the handheld apparatus 1 can be inserted. Also conceivable is a configuration in which threaded portions 111 and axial portions 112 are provided on the handheld apparatus 1 and corresponding pins are provided on the funnel 4. The axial portions 111 extend parallel to the longitudinal axis of the funnel 4, along which the funnel 4 is moved toward the handheld apparatus 1 for coupling to it. The threaded portions 111 extend at an obtuse angle in relation to the axial portions 112 respectively adjacent to them of the bayonet fastener 11. As a result, a bayonet fastener 11 in which the two interconnected parts are in contact with one another at defined portions that are not elastic or not very elastic can be realized, whereby more exact positioning of the two interconnected parts is made possible. In order to prevent unwanted release of the bayonet fastener 11, the aforementioned pressure pieces of one of the two interconnected parts may engage in corresponding clearances on the other of the interconnected parts respectively.

According to the view from below of FIG. 2*b*, the funnel 4 has on its workpiece side 41 shown here two negative pressure regions 42, 43 that are sealed with respect to one another and mounted one inside the other. The negative pressures in these negative pressure regions 42, 43 are generated by means of the pumps 5, 6, so that corresponding lines are provided between the pumps 5, 6 and the negative pressure regions 42, 43. The negative pressure regions 42, 43 extend in this case through the respective lines within the laser machining apparatus 100.

As can also be seen from FIG. 2*b*, the funnel 4 comprises on the workpiece side 41 two seals 47, 48, wherein in particular an outer seal 48 on the workpiece side 41 of the funnel 4 is an angular seal 48 and particularly preferably a sealing frame 48. The outer seal 48 may have a greater circumference than the inner seal 47. By means of the seals 47, 48, the two negative pressure regions 42, 43 can be sealed with respect to one another and with respect to the surroundings as long as the funnel is placed against a workpiece 200. The laser beam can then act on the workpiece 200 within the inner negative pressure region 42, wherein the exhaust gases from the laser machining are extracted by way of the funnel 4. The outer negative pressure region 43 may have a lower pressure than the inner negative pressure region 42, and thus exert a great holding force on the workpiece 200, which facilitates the positioning of the handpiece 1 on the workpiece 200. Two seals may likewise be provided on the handheld apparatus side 44 of the funnel 4, allowing leading through of the two negative pressure regions 42, 43 from the funnel 4 to the handheld apparatus 1 and further to the pumps 5, 6.

The inner negative pressure region 42 may be fluidically coupled to a suction pump 6 and the outer of the negative pressure regions 43 may be fluidically coupled to a vacuum pump 5. The suction pump 6 may be set up to generate a pressure of 150-300 mbar below atmospheric pressure or ambient pressure. The vacuum pump 5 may be set up to generate a pressure of 550-700 mbar below atmospheric pressure or ambient pressure. The inner negative pressure region 42 is coupled to the atmosphere by way of a supply-air opening 421. As a result, an air flow which allows the extraction of exhaust gases occurring during the laser machining can be generated in the inner negative pressure region by means of the suction pump 6.

The supply-air opening 421 may be set up not to allow laser beams to escape to outside the funnel 4 from the inner negative pressure region 42. For this, the supply-air opening 421 may be formed as labyrinthine, bent, kinked and/or otherwise such that a laser beam cannot leave the interior of the funnel 4 through the supply-air opening 421 and become a danger to persons in the vicinity.

The laser machining apparatus 100 may comprise a safety device, which is set up to interrupt the laser beams if the differential pressure between one of the negative pressure regions 42, 43 and the ambient pressure lies outside a permissible range. In this way it is possible to detect lifting off of the funnel 4 from the workpiece 200 and damage to the funnel 4 or the two negative pressure regions 42, 43 and to deactivate the laser to protect the device and to protect persons in the vicinity.

An RFID transponder which can be identified by means of an identification device may be provided for example on the funnel 4. The identification device may be provided on the handheld apparatus 1 and provide data of the RFID transponder for the laser machining apparatus 100. The laser machining apparatus 100 may thus for example automatically determine the type of funnel 4. If for example it is determined that the connected funnel 4 is a funnel 4 with just one negative pressure region 42, 43, the laser machining apparatus 100 may automatically dispense with the operation of one of the two pumps.

FIG. 3 shows some essential components of the laser machining apparatus 100, some of which are fitted in the housing (not shown) of the handheld apparatus 1. Shown in the upper region of FIG. 3 is the optical device 2, which serves for deflecting laser beams onto the workpiece 200. This device may be arranged completely or almost completely inside a housing of the handheld apparatus 1 and be coupled to the funnel 4 shown further below. The funnel is largely or completely located outside the structure of the optical device 2 or of the handheld apparatus 1. The funnel 4 is coupled with its handheld apparatus side 44 to the optical device 2. The funnel 4 may be placed with its workpiece side 41 against a workpiece 200 for the machining thereof.

The optical device 2 comprises a scanner mounting 13, on which a scanner 14 is mounted. The scanner mounting 13 is also coupled to a mirror deflecting and adjusting system 15, arranged on which in turn is a collimator mounting 16, in which a collimator that is not shown any further can be mounted. From the collimator, laser beams are conducted through the mirror deflecting and adjusting system 15, through a lead-through in the scanner mounting 13 and into the scanner 14. By means of the mirror deflecting and adjusting system 15, the laser beams coming from the collimator can be adjusted, so that they enter the scanner 14 at a defined angle and in a defined region. The scanner 14 comprises adjustable mirrors, by means of which the laser beams for machining the workpiece 200 are moved. After the deflection of the laser beams by the scanner 14, they pass once again through the lead-through in the scanner mounting 13 into the funnel 4 and from there onto the workpiece 200, in particular through a focusing element.

The scanner mounting 13 may be dimensioned such that it is enclosed by a cuboid with the side lengths 85 mm, 85 mm and 93 mm. The collimator mounting 16 may be dimensioned such that it is enclosed by a cuboid with the side lengths 63 mm, 71 mm and 115 mm. The mirror deflecting and adjusting system 15 may be dimensioned such that it is enclosed by a cuboid with the side lengths 24 mm, 71 mm and 72 mm. All of the figures given for the lengths apply with the tolerance of +10 mm, in particular of +5 mm.

FIG. 4 shows the same components as FIG. 3, with the difference that here the scanner 14 is not shown, for the sake of a better overview. The scanner mounting 13 has an L-shaped profile, wherein the funnel 4 can be coupled to one of the legs and the mirror deflecting and adjusting system 15 can be coupled to the other of the two legs.

The mirror deflecting and adjusting system 15 comprises a lead-through, in which the mirrors can be mounted such that they are angled in relation to one another. The mirrors are arranged such that laser beams are led through the lead-through, and their direction or position can be changed or adjusted by the mirrors. At least one of the mirrors may be a fully reflective mirror or a partially reflective mirror. The mirror deflecting and adjusting system 15 comprises an adjusting device for holding and/or adjusting the mirrors. The adjusting device may comprise tiltable mirror holders, adjusting screws and/or elastic bearing portions, wherein the mirrors can be mounted and/or can be adjusted by means of the mirror holders, the adjusting screws and/or the elastic bearing portions. The adjusting screws, and in particular the elastic bearing portions, may interact with one another for adjusting the mirrors, and in particular exert a force on the latter from two different sides of the mirrors. The mirror deflecting and adjusting system 15 may be produced in one piece, in particular be printed and/or sintered.

The mirror deflecting and adjusting system 15 may comprise sealing portions on two opposite sides of the mirror deflecting and adjusting system 15, by means of which the mirror deflecting and adjusting system 15 can be coupled in a sealing manner to the collimator mounting 16 and the scanner mounting 13. The sealing portions may be formed as grooves in which seals can be positioned. The mirror deflecting and adjusting system 15 may also comprise lead-throughs for pins for positioning the collimator mounting 16 and/or the scanner mounting 13. The mirror deflecting and adjusting system 15 may furthermore comprise an adjustable receptacle (not shown any more specifically) for coupling in a guide laser and/or pilot laser onto the beam path of the working laser of the laser machining apparatus 100. This receptacle may for example be formed by means of screws and corresponding threaded openings such that a guide laser and/or pilot laser coupled thereto can be exactly positioned and adjusted. The mirror deflecting and adjusting system 15 may also comprise clearances for disconnecting screws for separating the mirror deflecting and adjusting system 15 from the scanner mounting 13 and/or from the collimator mounting 16. The disconnecting screws can in this case be mounted within these clearances for separating the mentioned components. If a separating force is exerted by way of the separating screws on the components to be separated, the components can undergo deformation just in the region of the clearances. A deformation within the clearances does not stand in the way of the mentioned components being connected once again so as to ensure that the connected components lie as closely as possible against one another.

FIG. 5 shows a detailed view of the scanner mounting 13. This couples the mirror deflecting and adjusting system 15 to the scanner 14 and the funnel 4 directly, as is shown in FIG. 4. The scanner mounting 13 may comprise at least one sealing portion for the fluid-tight connection of the mirror deflecting and adjusting system 15. This sealing portion may for example comprise a groove for a seal and be provided on the rear side of the scanner mounting 13, which cannot be seen in FIG. 5 and is facing the mirror deflecting and adjusting system 15. The scanner mounting 13 may also comprise at least one lead-through 132 for pins for positioning the mirror deflecting and adjusting system 15 and/or the scanner 14 on the scanner mounting 13. Furthermore, the scanner mounting 13 may comprise clearances 133 for disconnecting screws for separating the scanner mounting 13 from the mirror deflecting and adjusting system 15. The scanner mounting 13 may be produced in one piece, in particular be printed and/or sintered. The scanner mounting 13 and the further components of the optical device 2 may consist of metallic, synthetic or hybrid materials The scanner mounting 13 has on its one leg at a through-hole 134 for leading the laser beam from the mirror deflecting and adjusting system 15 shown in FIG. 4 to the workpiece 200. The through-hole 134 may be a threaded bore and be set up for being coupled to a stop plate and/or a measuring tube by way of the thread. The scanner mounting 13 may also comprise a sealing surface for placing against the funnel 4, the surface being located in a lower region of the scanner mounting. The scanner mounting 13 may also comprise a thermal attachment surface 137 for dissipating heat from the scanner shown in FIG. 3, wherein the lost heat of the scanner 14 is produced near the attachment surface 137. The attachment surface 137 may be formed as large as possible for better thermal conductivity. It conducts the waste heat of the scanner 14 to the mirror deflecting and adjusting system 15, from where it is dissipated further into the collimator mounting 16.

The scanner mounting 13 may also comprise a coupling portion 138 for coupling the scanner mounting 13 to a protective glass of the scanner 14. This coupling portion 138 may be formed for example as a thread. The scanner mounting 13 may comprise furthermore connections, receptacles and/or lines for a camera, for an illumination, for pressure sensors, for a filter and/or prefilter, for a sensor for detecting darkness in the funnel 4, for an identification device, for a temperature sensor, to a suction pump 6 and/or to a vacuum pump 5. These connections, receptacles and lines may be formed as lead-throughs, blind holes, threaded bores or other geometries on the scanner mounting 13 and be adapted to the mentioned components.

The scanner mounting 13 may comprise or receive components of a bayonet fastener 11 by means of which the handheld apparatus 1 can be coupled to the funnel 4. The components of the bayonet fastener 11 may be for example pins which can be mounted in corresponding clearances of the scanner mounting 13 and which can interact with threaded portions 111, shown in FIG. 2*a*, of the bayonet fastener 11 for coupling the respective components. The scanner mounting 13 may accordingly comprise clearances 135 for pressure pieces and/or guide pins of the bayonet fastener 11. It is alternatively or additionally conceivable that the scanner mounting 13 comprises threaded portions of the bayonet fastener 11. This configuration is not shown in FIG. 5.

FIG. 6 shows a collimator mounting 16. The collimator itself can be inserted into the collimator mounting 16 from the left in FIG. 6. The collimator mounting 16 may be coupled directly to the mirror deflecting and adjusting system 15. The mirror deflecting and adjusting system 15 may in turn be coupled directly to the scanner mounting 13.

The collimator mounting 16 may comprise at least one sealing portion 161 and/or at least one coupling portion 162 for the sealing coupling of the collimator mounting 16 to the collimator and/or to the mirror deflecting and adjusting system 15. The sealing portion 161 may be formed as a groove in which a seal can be positioned. The coupling portion 162 may comprise a clearance which is dimensioned to receive the collimator. In the region of the coupling portion 162 there may be provided a clamping portion 165 for clamping the collimator against twisting. Once a collimator has been inserted into the coupling portion 162, it can be ensured by its clamping that the collimator is not adjusted with respect to the otherwise fully adjusted handheld apparatus 1, whereby otherwise the previously correctly adjusted laser beams would be conducted through the handheld apparatus 1 or through the funnel 4 in a then inadmissible way.

The collimator mounting 16 may be formed as a heat bridge for dissipating waste heat of the scanner 14 and for this have a contact area with respect to the mirror deflecting and adjusting system 15 that is dimensioned with a correspondingly large surface area.

The collimator mounting 16 may also comprise lead-throughs for pins for positioning the collimator mounting 16 on the mirror deflecting and adjusting system 15.

It is conceivable that the collimator mounting 16 and/or the scanner mounting 13 and/or the mirror deflecting and adjusting system 15 are coupled to one another by way of in particular four screws. Corresponding lead-throughs 163 or threaded holes may be provided for this on the mentioned components. Four such lead-throughs 163 are shown in FIG. 6. The further components, connected to one another by way of the screws, may comprise correspondingly coaxially positioned lead-throughs. It is alternatively or additionally conceivable that two or three of the components, the scanner mounting 13, the mirror deflecting and adjusting system 15 and the collimator mounting 16, are produced in one piece with one another, and in particular are additively manufactured.

The collimator mounting 16 may comprise clearances for disconnecting screws for separating the collimator mounting 16 from the mirror deflecting and adjusting system 15. It may also be provided that the collimator mounting 16 comprises a cable and/or hose guide and/or that the collimator mounting 16 is produced in one piece, in particular is printed and/or sintered.

The invention is not restricted to the aforementioned embodiments, but may be varied in various ways. In particular, features of the aforementioned embodiments can be combined in any logically possible way. All of the features and advantages disclosed in the claims, in the description and in the figures, including design details and spatial configurations, may be essential to the invention both individually and in combination with one another.

REFERENCE NUMERALS

1 Handheld apparatus
2 Optical device
3 Supply unit
4 Funnel
5 Vacuum pump
6 Suction pump
11 Bayonet fastener
111 Threaded portion
112 Axial portions
12, 12' Handle
13 Scanner mounting
132 Lead-through
133 Clearance
134 Through-hole
135 Clearance
137 Attachment surface
138 Coupling portion
14 Scanner
15 Mirror deflecting and adjusting system
16 Collimator mounting
161 Sealing portion
162 Coupling portion
163 Lead-throughs
165 Clamping portion
40 Connection
41 Workpiece side
44 Handheld apparatus side
47 Seal
48 Seal
421 Supply-air opening
100 Laser machining apparatus
200 Workpiece
300 Terminal

The invention claimed is:

1. A handheld laser machining apparatus for machining a workpiece, comprising:

a handheld apparatus with an optical device for deflecting laser beams onto the workpiece, a supply portion for controlling the handheld apparatus in an open-loop or closed-loop manner and for supplying power and fluid to the handheld apparatus, and a funnel with a handheld apparatus side and a workpiece side, for coupling the handheld apparatus to the workpiece, wherein the optical device further comprises a scanner, mounted on a scanner mounting, a mirror deflecting and adjusting system and a collimator, mounted in a collimator mounting, wherein the scanner mounting couples the mirror deflecting and adjusting system to the scanner and the funnel directly, and wherein the scanner mounting comprises at least one lead-through for pins for positioning the mirror deflecting and adjusting system.

2. The handheld laser machining apparatus as claimed in claim 1, wherein the scanner mounting is produced in one piece and/or wherein the scanner mounting comprises at least one sealing portion, including at least a groove configured to receive a seal, for the fluid-tight connection of the mirror deflecting and adjusting system and/or wherein the scanner mounting comprises at least one lead-through for pins for positioning the scanner and/or wherein the scanner mounting comprises clearances for disconnecting screws for separating the scanner mounting from the mirror deflecting and adjusting system and/or wherein the scanner mounting—is produced in one piece, by being printed and/or sintered.

3. The handheld laser machining apparatus as claimed in claim 1 wherein the scanner mounting comprises a through-hole for leading the laser beam from the mirror deflecting and adjusting system to the workpiece, wherein the through-hole is a threaded bore and/or is set up to be coupled to a stop plate and/or a measuring tube and/or wherein the scanner mounting comprises a sealing surface for placing against the funnel and/or wherein the scanner mounting comprises a thermal attachment surface for dissipating heat from the scanner, wherein the lost heat of the scanner is produced near the attachment surface.

4. The handheld laser machining apparatus as claimed in claim 1, wherein the scanner mounting comprises a coupling portion, including at least a thread, for coupling the scanner mounting to a protective glass of the scanner and/or wherein the scanner mounting comprises connections, receptacles and/or lines for a camera, for an illumination, for pressure sensors, for a filter and/or prefilter, for a sensor for detecting darkness in the funnel, for an identification device configured to identify an RFID transponder, for a temperature sensor, to a suction pump and/or to a vacuum pump.

5. The handheld laser machining apparatus as claimed in claim 1, wherein the scanner mounting comprises components of a bayonet fastener by which the handheld apparatus can be coupled to the funnel and/or wherein the scanner mounting comprises clearances for pressure pieces and/or guide pins of the bayonet fastener and/or wherein the scanner mounting comprises threaded portions of the bayonet fastener.

6. The handheld laser machining apparatus as claimed in claim 1, wherein the mirror deflecting and adjusting system comprises a mounting and/or an adjusting device for holding and/or adjusting two mirrors, wherein at least one of the mirrors is a fully reflective mirror or a partially reflective mirror and/or wherein the adjusting device comprises tiltable mirror holders, adjusting screws and/or elastic bearing portions, wherein the mirrors can be borne and/or can be adjusted by the mirror holders, the adjusting screws and/or the elastic bearing portions, and/or wherein the mirror deflecting and adjusting system is produced in one piece, by being printed and/or sintered.

7. The handheld laser machining apparatus as claimed in claim 1, wherein the mirror deflecting and adjusting system comprises sealing portions, including at least grooves configured to receive seals, on two opposite sides, by which the mirror deflecting and adjusting system can be coupled in a sealing manner to the collimator mounting and the scanner mounting and/or wherein the mirror deflecting and adjusting system comprises lead-throughs for pins for positioning the collimator mounting and/or the scanner mounting and/or wherein the mirror deflecting and adjusting system comprises an adjustable receptacle for coupling in a guide laser and/or pilot laser onto the beam path of a working laser of the laser machining apparatus and/or wherein the mirror deflecting and adjusting system comprises clearances for disconnecting screws for separating the mirror deflecting and adjusting system from the scanner mounting and/or from the collimator mounting.

8. The handheld laser machining apparatus as claimed in claim 1, wherein the collimator mounting is coupled directly to the mirror deflecting and adjusting system and/or the mirror deflecting and adjusting system is coupled directly to the scanner mounting and/or wherein the collimator mounting comprises at least one sealing portion, including at least a groove configured to receive a seal, and/or at least one coupling portion, including at least a clearance configured to receive the collimator, for the sealing coupling of the collimator mounting to the collimator and/or to the mirror deflecting and adjusting system and/or wherein the collimator mounting is formed as a heat bridge for dissipating waste heat of the scanner and/or wherein the collimator mounting comprises lead-throughs for pins for positioning the collimator mounting on the mirror deflecting and adjusting system and/or wherein the collimator mounting and/or the scanner mounting and/or the mirror deflecting and adjusting system are coupled to one another by way of four screws and/or wherein the collimator mounting comprises clearances for disconnecting screws for separating the collimator mounting from the mirror deflecting and adjusting system and/or wherein the collimator mounting comprises a clamping portion, including at least protrusions, for clamping the collimator against twisting and/or wherein the collimator mounting comprises a cable and/or hose guide and/or the collimator mounting is produced in one piece by being printed and/or sintered.

9. The handheld laser machining apparatus as claimed in claim 1, wherein a mobile terminal for setting the laser machining apparatus is provided, wherein the terminal is set up in particular to set the laser machining apparatus in a switched-off state of the supply unit.

* * * * *